United States Patent [19]
Lambou et al.

[11] 3,891,571
[45] June 24, 1975

[54] FOAM PRODUCING COMPOSITION CONTAINING WHEY SOLIDS

[75] Inventors: Madeline G. Lambou; James J. Spadaro, both of New Orleans; Eunice M. Rusch, Metairie, all of La.

[73] Assignee: The United States of America as represented by the Secretary of Agriculture, Washington, D.C.

[22] Filed: Oct. 26, 1973

[21] Appl. No.: 410,052

[52] U.S. Cl. ............... 252/354; 47/2; 71/64 G; 71/DIG. 1; 252/307; 252/356
[51] Int. Cl. ............................................. B01f 17/30
[58] Field of Search ........... 252/307, 354, 356; 47/2

[56] References Cited
UNITED STATES PATENTS

| | | | |
|---|---|---|---|
| 2,391,559 | 12/1945 | Faulkner | 252/307 X |
| 3,119,698 | 1/1964 | Gunther | 252/307 X |
| 3,150,989 | 9/1964 | Parsons | 252/307 X |
| 3,479,285 | 11/1969 | Barthauer | 252/307 X |
| 3,712,865 | 1/1973 | Evans et al. | 252/356 X |

*Primary Examiner*—Richard D. Lovering
*Attorney, Agent, or Firm*—M. Howard Silverstein; Max D. Hensley

[57] ABSTRACT

Highly economical agricultural foams were prepared from selected formulations containing whey solids, a surfactant and a viscosity builder. Greater versatility and durability are imparted to these foams by incorporating specified concentrations of animal hide glues. The foams are light in weight, of high expansion and form "skins" which make them specifically useful in providing protection to biological plants from frost and freezing temperatures; can be used as carriers for defoliants, herbicides, fungicides, sterilants and other chemicals; and, may be used as farm markers and foam covers after soil injection-fumigation.

7 Claims, No Drawings

FOAM PRODUCING COMPOSITION CONTAINING WHEY SOLIDS

A non-exclusive, irrevocable, royalty-free license in the invention herein described, throughout the world for all purposes of the United States Government, with the power to grant sublicenses for such purposes, is hereby granted to the Government of the United States of America.

This invention relates to the solids recovered from whey remaining after cheese is manufactured. More specifically, this invention relates to the preparation of improved agricultural foams. The agricultural foams are designed to provide protection to biological plants in the form of carriers of chemicals that prevent infections of plants and contribute to improved methods of agriculture as an adjunct in weed eradication.

DEFINITIONS AND BACKGROUND

Agricultural foams contain whey solids derived from milk from which cheese is manufactured. Foams of the present invention are of whey solids origin. Whey solids are recovered from whey, the aqueous solution remaining after the curds are collected for cheese manufacture. Whey solids, among other compounds, contain a high content of lactose ranging from 67 to 78.5 percent and protein ranging from 7.5 to 51 percent.

Materials from which the whey solids of this invention are obtained originate with the dairy and cheese manufacturing industries. Whey solids are available in a wide range of Trade Names reflecting gradations as to physical properties, prices, composition, and method of manufacture. Whey solids may be edible or inedible (feed-grade) depending on the method of manufacture. The majority of the edible whey solids are spray dried leaving the protein content of the solids essentially undenatured. Inedible or feed-grade whey solids are predominantly roller dried and the extent of denaturation of the protein would vary with the care exercised in drying the product. The whey solids of the present invention were selected for preparation of agricultural foams because they contain an appreciable content of protein in addition to the high lactose content.

B. H. Webb, USDA scientist, described the "Utilization of Whey in Foods and Feeds" in the proceedings of the Whey Utilization Conference, University of Maryland, June 1970. From this report we learn that the protein present in whey solids in lactalbumin and the milk sugar is lactose. If during recovery the lactose is crystallized, the product is stabilized and does not readily pick up moisture and cake. Likewise, if the whey solids are manufactured by foam-spray drying, the spherical particles will be readily dispersible and will not cake. The least expensive of the whey solids products are those that are roller dried and are suitable only for animal feed.

These agricultural foams contain glues derived from collagen which is a protein constituent of animal hide and bone. Foams of the present invention are of whey solids origin to which selected concentrations of hide glues are added to improve the desired characteristics. Hide glues are derived from collagenous materials present in hide pieces and in connective tissue associated with the hide. Collagen contains a disproportionately high content of hydroxyproline and proline, respectively 14 percent and 15 percent.

The glues of this invention originate with the packing and canning industries and are principally of cattle origin. As a group, hide glues are the strongest most versatile of animal glues with respect to broad usage in industry. The glues of the present invention were selected for preparation of the foams of this invention because they are basically protein.

The National Association of Glue Manufacturers, Inc., with headquarters in New York City, has prepared a booklet bearing the title "Animal Glue in Industry" describing an excellent overall view on glues. From this piece of literature we learn that "Animal glue is an organic colloid of protein derivation which meets with constantly increasing acceptance for adhesive, sizing and coating compositions, and colloidal applications in industry. This product is the oldest type of glue . . . "

Skin is a term used with reference to the agricultural foams of this invention in describing the outermost layer and is usually a continuous filament-type layer which forms on top the wet foam within 1 to 4 hours after the foam has been allowed to set. This skin protects the foam underneath from the ravages of wind and seals the area from rapid changes in temperature. The skin helps keep the foam where it has been placed, that is, without dissipation by the elements; For purposes of this invention the concern has been in securing the foam to the location where it is installed, around and about a botanical environment where filaments similar to a spider web anchor skin to blades of grass, stems, leaves, or other protrusions about the periphery of the earth. The skins of our foams have thicknesses ranging from 0.0001 to 0.001 inch.

These agricultural foams contain viscosity builders that are complex polysaccharides such as Xanthan gum (molecular weight about 6,000,000) which is manufactured commercially as the sodium, potassium or calcium salt containing D-glucose, D-mannose and D-glucuronic acid as the dominant hexose units in a ratio of 3:3:1 and low percentages (under 5 percent) of O-acetyl groups and pyruvic acid groups. Food grade Xanthan gum known as Keltrol, an industrial grade, Kelzan, and mixtures of Kelzan and locust bean gum, a galactomannan polysaccharide (molecular weight about 310,000) have been used. The latter mixture is known commercially as Kelgum. Other viscosity builders, also polymers, are hydroxyethylcellulose and hydroxypropyl cellulose.

Surfactants used in these foams may be selected from a group such as an anionic ammonium lauryl trioxyethylene sulfate or one of the ammonium substituted alkyl sulfates wherein the alkyl component ranges from $C_{12}$ to $C_{18}$.

THE PRIOR ART

U.S. Pat. No. 2,875,555, issued Mar. 3, 1959, discloses the use of foam in protecting plants from frost damage to yield a botanical plant which would be free from frostation and would comprise covering at least the susceptible portion of said plant when danger of frost would be iminent, with an enveloping protective layer having the thickness of at least about ½ inch of a stable, longlasting foam. These inventors disclose having covered a plant to the extent of 1 inch thickness with foam which would last at least 4 hours. According to the process of said invention, it is possible to produce a foam which will live overnight. The volume of foam produced by their process would be ten times as great as the formulation from which it was produced.

Polymer-forming materials were included in their formulations.

Comparatively, it should be noted that the volume of the foam of the present invention is kept at between 11 and 70 times as great as the formulation from which it originated. Persistence or life-expectancies of these foams depended on the temperatures at which the foams were used and ranged from 0.8 to 3 at 90°F; 7 to 24 hours at 75°F and 2 to 8 days at 36°F (Table B).

The whey solids of the present invention contain protein which is a polymer and lactose, a dimer; animal glue is a polymer; and the viscosity-builder is a polymer. No saponin is employed. The saponin used by others corresponds to our surfactants, selected for their high foaming qualities. The polymeric materials employed by the prior art corresponds to our whey solids, animal glue and viscosity-builder. The quantities which have led to our preferred embodiments indicate formulations which would contain about 1 to 2 percent whey solids, 0.5 to 1 percent animal glue, 0.3 percent to 2 percent surfactant and 0.1 to 0.3 percent of a viscosity-builder, which is also a polymer.

In the prior art also we find an article by Paul A. Sanders which appears in Vol. 84 of the October 1969 issue of American Perfumer and Cosmetics under the title "Unusual Aqueous Aerosol Foams." The composition and properties of these foams have different uses than those of the agricultural foams of the present invention, which were prepared at the Southern Regional Research Center in New Orleans. Sanders' foams are principally for use as cosmetics and in pharmaceutical products, and are characterized as "snowflake foam," "crackling foam," "collapsing foam," "buoyancy foam," etc. Such materials would not be suitable for agricultural foams.

OBJECTIVES OF THE PRESENT INVENTION

The main object of the present invention is to provide a foam producing agent in the form of a water-dispersible proteinaceous-carbohydrate product.

A secondary objective is to increase the effectiveness of the foaming agent derived from milk (whey solids) by incorporating therein one or more protein bearing materials.

Other objectives of the present invention are to provide cold weather foams for protecting botanical plants from frost and freeze damage; to provide foams for use as carriers for herbicides, defoliants, nutrients or other agricultural chemicals; and to provide farmers with a self-destructive foam - maker with a life expectancy of at least two hours.

In the investigative work leading to the present invention, effectiveness of feed-grade whey solids can be improved considerably beyond that already reported (Ser. No. 374,731, filed June 28, 1973) by the addition of 0.5 to 1.0 percent animal glue. Expansions (foam volume vs liquid volume) obtained ranged from 25 to 51 times that of the original liquid volume. Persistence at 36° F ranged from 32 to 68 hours and at 64° to 78°F from 3 to 27 hours, depending on the concentration of animal glue added. Quality of persistence could be further tailored for the particular end use by varying the concentrations of ingredients as follows: 1 percent whey solids plus 2 percent surfactant, plus 1 percent animal glue and 0.3 percent of a viscosity-builder improved persistence of the foams by 200 percent at 36° F, 385 percent at 68°F, and 400 percent at 73°F; when the concentration of the surfactant was reduced to 0.3 percent, greatest persistence, 192 hours or 8 days at 36°F, was obtained; skins were also strongest when the concentration of surfactant was held at the 0.3 percent level; if weaker skins and less persistence are desirable, an increase in concentration of surfactant would provide the necessary qualities; dilution with water of the above formulation to the extent of 20 percent, that is, increasing the volume of the formulation by 20 percent, seemed to maximize foam characteristics of a good, all-purpose formulation.

In the process of investigation, the combination of whey solids and animal glue was selected because agricultural foams are generally water-based, self-destructive, and can be made with varying lifetime periods. Agricultural foams can be made from nontoxic ingredients such as whey solids and animal glues and can be formulated to endure for different periods of time and weather conditions depending on the application for which they are designed. Of immediate concern is protection of biological plants from frost and freeze damage, and the requirements would indicate that the life span of the foam, or of the duration of protection, would be about 24 to 48 hours or longer depending on the geographical area where the plants are to be protected. Proper adjustment of concentrations of ingredients of the above formulation will produce as much as 192 hours or 8 days of protection near, at, or below freezing temperatures. On the other hand, formulations investigated were amenable to adjustments for use as carriers for herbicides, fungicides, defoliants and the like where life expectancy of a foam is short, perhaps one to three hours. Service as a soil cover after injection of the soil with volatile chemicals, requiring a life-expectancy of three to 5 hours was also possible. The present invention provides the farmer who is working a farm of approximately two miles square with a means of marking his starting place and outlining the area he has worked. Life-span of such a foam would be perhaps at least two hours.

THE PROBLEM

Investigative work conducted by Louisiana State University in the year 1967 indicate that foams having a use-life of 24 to 48 hours under freezing weather conditions were obtained when edible gelatin was used as the stabilizer; however, this stabilizer is unsuitable for large-scale crop protection mainly because of the costs of ingredients and manner of application. For practical applications it was necessary to develop formulations and reduce costs to the lowest possible level while maintaining all other requirements for the foams. The requirements for such foams included low cost, easy generation, zero toxicity (for both plants and animals), sufficient stability to maintain an adequate cover overnight in freezing temperatures and to dissipate with rising temperatures. The combined requirements called for foams with insulative capacities which would allow them to serve as protective covers under adverse weather conditions when winds are high and temperatures drop to, or below freezing.

Preferred spumific formulations are products of investigative effort. These formulations contain specified quantities of whey solids and animal glues which are most suitable. The most suitable whey solids are the subject of an earlier patent application (Serial number not received yet), as are the animal glues (Ser. No.

203,836, filed Dec. 1, 1971, and now abandoned). Formulations were evaluated for drainage, density, expansion, viscosity and persistence or life-span. Techniques employed were those of Braud and Chesness in their "Physical Properties of Foam Insulation for Protecting Plants Against Cold Weather," a paper presented at the Winter Meeting of the American Society of Agricultural Engineers in Chicago, Illinois, Dec. 10–13, 1968. The laboratory-size cone-type foam generator fabricated by Braud and Chesness, was used to generate selected foams for evaluation.

The generated foams were observed at room temperature (about 75°F), at 36°F and outdoors where the temperature varied widely. Not only does temperature vary widely, but other conditions such as wind speeds, and cloudy vs. full sun exert their influence. Hence persistence outdoors tends to vary as shown in Table A.

The drained liquor was collected in the most suitable graduated cylinders (100 ml). Drainage was measured (in ml) as quantity of liquor collected from collapsing foam with respect to time, that is, "volume vs. time." Persistence was observed as the period of time required for a foam to retain 33 percent of its original depth. Density and Expansion were calculated from the weight and volume of the foam.

IMPROVEMENT USING ANIMAL GLUES

We have discovered that whey solids combined with animal glues are greatly improved stabilizers in formulations used to generate foams for insulating plants, as herbicide, fungicide and defoliant carriers, as farm markers and as covers over soil after injection of the soil with a gaseous fumigant. Persistence of the foams was enhanced by choice and concentration of surfactant and choice and concentration of a viscosity-builder. Costs of the formulations could be reduced up to 90 percent depending on the ingredients included and their concentrations.

The following examples are provided to illustrate the invention, utilizing the preferred embodiments, and are not to be construed as limiting the invention in any manner whatever.

EXAMPLES

Improvement in whey solids foam characteristics by addition of animal glue protein is outlined in Table A.

TABLE A

IMPROVEMENT OF WHEY SOLIDS FOAM CHARACTERISTICS WITH ADDITION OF PROTEIN AS ANIMAL GLUE

| Concentration | | | | | |
|---|---|---|---|---|---|
| Whey Solids % | Animal Glue % | Expansion | Persistence in Hours at | | |
| | | | 36°F | 73°F | 64–78°F[1] |
| 1 | — | 51X | 32 | 6 | 7 |
| 1 | 0.5 | 38X | 41.5 | 6 | 23 |
| 1 | 0.8 | 31X | 60 | 18 | 3 |
| 1 | 1 | 31X | 66.5 | 24 | 27 |
| 2 | — | 50X | 41 | 6 | 7 |
| 2 | 0.5 | 45X | 56 | 8+ | 8 |
| 2 | 0.8 | 33X | 56 | 17 | 8 |
| 2 | 1 | 25X | 68 | 24 | — |

[1]Variable outdoor temperatures.

Conclusions drawn from Table A include: expansions decreased with increasing concentration of animal glue. Gratifying improvements in persistence were obtained at each temperature level. Whey solids at a 2 percent concentration did not significantly increase persistence at any temperature level. Hence only a 1 percent concentration of whey solids is required. A concentration of 1 percent animal glue added to the whey solids formulation improved persistence at all temperature levels.

Examples of the preferred formulations containing whey solids and animal glue, each formulation tailored for a different end use, are tabulated in Table B.

Table B

EXAMPLES OF FOAM FORMULATIONS IMPROVED BY ADDITION OF ANIMAL GLUE- THEIR PERSISTENCE AND APPLICATION.

| % Composition of Formulation | | | | | | | Hrs. Persistence at | | | |
|---|---|---|---|---|---|---|---|---|---|---|
| Whey Solids | Animal Glue | Viscosity Builder | Surfactant A | Surfactant B | Skin Formation | Expansion | 36°F | 75°F | 90°F | Application |
| 1.5 | — | — | — | 0.5 | None | 70X | | | 0.8 | Short term foam |
| 0.8 | 0.8 | 0.24 | 0.7 | — | Good | 36X | 135 | 7 | 3.0 | Good all-purpose foam |
| 1.0 | 1.0 | 0.3 | 0.3 | — | Excellent | 20X | 192 | 8 | 1.8 | For use at/or below freezing |
| 1.0 | 1.0 | 0.1 | 2.0 | — | Good | 45X | 72 | 9 | 2.0 | All-purpose |
| 1.0 | 1.0 | 0.2 | 2.0 | — | Good | 28X | 144 | 16 | 2.5 | For use at/or below freezing |
| 1.0 | 1.0 | 0.3 | 2.0 | — | Good | 21X | 120 | 17 | — | " |
| 1.0 | 1.0 | 0.5 | 2.0 | — | Good | 11X | 108 | 24 | — | " |
| 1.0 | 1.0 | 0.3 | 1.1 | — | Good | 37X | 70 | 8 | 1.5 | All-purpose |
| 1.0 | 1.0 | 0.3 | 1.5 | — | Good | 43X | 85 | 7 | 1.3 | " |
| 1.0 | 1.0 | 0.3 | 1.9 | — | Good | 43X | 53 | 7 | 1.3 | " |

The following conclusions may be drawn from Table B. Foam formulations may be tailored from whey solids for a variety of applications. Mixed with animal glue, a viscosity-builder and a surfactant, a good all-purpose foam is obtained when the 1 percent whey solids, 1 percent animal glue, 0.3 percent viscosity-builder and 1 percent surfactant is diluted 20 percent. If the foam is to be used at or near freezing temperatures, concentrations of whey solids and animal glue should be at the 1 level, there should be no change in the concentration of viscosity-builder, but the concentration of surfactant should be reduced to 0.3 percent. This produces a dense, low expansion foam which endures at 36°F for 192 hours or 8 days.

We claim:

1. A foam precursor composition that can be generated to a foam capable of retaining its configuration at or below 36°F for a period of time up to about 8 days, said foam precursor composition consisting of a homogenous suspension of water containing about from 1 to 2 percent of whey solids, the protein content of which is about from 7.5 to 51 percent; about from 0.5 to 1 percent of animal hide glue, a collagenous component; about from 0.3 to 2 percent of a surfactant selected from the group consisting of:
an anionic ammonium lauryl trioxyethylene sulfate, and
an ammonium substituted $C_{12}$ to $C_{18}$ alkyl sulfate; and about from 0.1 to 0.3 percent of a viscosity builder selected from the group of water dispersible polymers consisting of:
hydroxyethyl cellulose,
hydroxypropyl cellulose,
xanthan gum, both food grade and industrial grade, and
mixtures of industrial grade xanthan gum and locust bean gum.

2. The foam precursor composition of claim 1 wherein the surfactant is an anionic ammonium lauryl trioxyethylene sulfate.

3. The foam precursor composition of claim 1 wherein the surfactant is an ammonium substituted $C_{12}$ to $C_{18}$ alkyl sulfate.

4. The foam precursor composition of claim 1 wherein the viscosity builder is hydroxyethyl cellulose.

5. The foam precursor composition of claim 1 wherein the viscosity builder is hydroxypropyl cellulose.

6. The foam precursor composition of claim 1 wherein the viscosity builder is either food grade or industrial grade xanthan gum.

7. The foam precursor composition of claim 1 wherein the viscosity builder is one of a variety of mixtures of industrial grade xanthan gum and locust bean gum.

* * * * *